(12) United States Patent
Dorsch et al.

(10) Patent No.: US 10,031,611 B2
(45) Date of Patent: Jul. 24, 2018

(54) METHOD FOR DETECTING A DOUBLE-CLICK INPUT

(71) Applicant: Robert Bosch GmbH, Stuttgart (DE)

(72) Inventors: Rainer Dorsch, Dettenhausen (DE); Christian Haubelt, Kritzmow (DE); Anna Christina Strohrmann, Reutlingen (DE); Sebastian Stieber, Rostock (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1 day.

(21) Appl. No.: 14/967,979

(22) Filed: Dec. 14, 2015

(65) Prior Publication Data
US 2016/0170557 A1 Jun. 16, 2016

(30) Foreign Application Priority Data
Dec. 15, 2014 (DE) .......................... 10 2014 225 853

(51) Int. Cl.
*G06F 3/0488* (2013.01)
*G06F 3/041* (2006.01)
*G06F 1/16* (2006.01)

(52) U.S. Cl.
CPC .......... *G06F 3/0416* (2013.01); *G06F 1/1694* (2013.01); *G06F 3/0488* (2013.01)

(58) Field of Classification Search
CPC ..... G06F 3/0488; G06F 3/0416; G06F 1/1694
See application file for complete search history.

(56) References Cited

U.S. PATENT DOCUMENTS

| | | | |
|---|---|---|---|
| 2012/0038675 A1* | 2/2012 | Johnson | G06F 1/1686 345/660 |
| 2013/0100023 A1* | 4/2013 | Chen | G06F 3/0421 345/166 |
| 2015/0116205 A1* | 4/2015 | Westerman | G06F 3/016 345/156 |
| 2016/0206921 A1* | 7/2016 | Szabados | A61B 5/0024 |

FOREIGN PATENT DOCUMENTS

| | | |
|---|---|---|
| DE | 10 2008 054 732 | 6/2010 |
| EP | 1930801 A | 6/2008 |

* cited by examiner

*Primary Examiner* — Charles Hicks
(74) *Attorney, Agent, or Firm* — Norton Rose Fulbright US LLP; Gerard Messina

(57) ABSTRACT

A method is provided for detecting a double-click input on an electrical device and an electrical device, the detection of the double-click input taking place by analyzing at least one input signal generated with the aid of at least one acceleration sensor, in a first method step (or task), it being monitored whether the input signal falls below a predefined first threshold value in absolute value during a first predefined time interval, in a second method step, exceeding of a second threshold value in absolute value by the input signal is detected, in a third method step, it being monitored whether the input signal falls below a predefined third threshold value in absolute value during a third predefined time interval, and in a fourth method step, exceeding of a fourth threshold value in absolute value by the input signal being detected.

7 Claims, 1 Drawing Sheet

METHOD FOR DETECTING A DOUBLE-CLICK INPUT

RELATED APPLICATION INFORMATION

The present application claims priority to and the benefit of German patent application no. 10 2014 225 853.7, which was filed in Germany on Dec. 15, 2014, the disclosure of which is incorporated herein by reference.

FIELD OF THE INVENTION

The present invention is directed to a method for detecting a double-click input.

BACKGROUND INFORMATION

Such methods are generally believed to be understood. For example, a method for detecting a double-click is discussed in the publication DE 10 2008 054 732 A1, a first input signal being identified in a first method step, a second input signal being identified within a predefined reference time in a second method step, a time interval between the first input signal and the second input signal being determined in a third method step, and an adapted reference time being set as a function of the time interval in a fourth method step.

This method has the disadvantage that it has a comparatively high proportion of double-click inputs wrongly detected as positive, i.e., in practical use of a device operated according to this method for detecting double-click inputs—in particular a mobile telephone, a portable computer, such as a so-called tablet computer or the like—there are a comparatively large number of situations in which, because the device is being used or carried, for example, when walking or during other activities or movements which are not primarily oriented toward user input, a double-click input is detected, although such a double-click input was not intended on the part of the user of the device.

SUMMARY OF THE INVENTION

It is an object of the present invention to provide a method for detecting a double-click input and an electrical device, a lower rate of double-click inputs wrongly detected as positive being allowed compared to the related art and with the aid of which nonetheless double-click inputs may be detected reliably and securely, in particular in combination with a comparatively lower power consumption for carrying out the detection method for detecting the double-click inputs.

The method according to the present invention for detecting a double-click input and the electrical device according to the other independent claims have the advantage over the related art that the double-click inputs wrongly detected as positive are reduced to a minimum, i.e., the proportion of user inputs detected as double-click inputs, which were not intended as double-click inputs on the part of the user, however, is comparatively low. At the same time, it is advantageously possible according to the present invention that a very high detection rate of double-click inputs may be guaranteed.

Advantageous embodiments and refinements of the present invention may be inferred from the subclaims and the description with reference to the drawings.

According to one refinement, it is provided that the detection of the double-click input on the electrical device takes place only for the case in which the exceeding taking place during the fourth method step and the input signal subsequently falling below the fourth threshold value within a fifth time interval are detected after the beginning of the second time interval. In this way, a still higher detection rate of double-click inputs and the avoidance of double-click inputs wrongly detected as positive may be implemented in a particularly advantageous way.

According to another refinement, it is provided that the thresholds are established adaptively on the basis of the signal curve and possible preceding thresholds.

In addition, the threshold value establishment may be based on scenarios (for example, "office scenario" or "outdoor scenario").

According to another refinement, it is provided that the input signal during the second predefined time interval is less in absolute value than a chronologically varying first envelope threshold value, which decreases monotonously in absolute value, and/or the input signal is less in absolute value during the fourth predefined time interval than a chronologically varying second envelope threshold value, which decreases monotonously in absolute value. In this way, it is possible according to the present invention in a particularly advantageous way that double-click inputs may be reliably differentiated from other inputs of the user or also from the detected movements of the electrical device, which do not correspond to a user input. According to the present invention, the input signal includes in particular a signed signal of an acceleration sensor (for sensing the linear acceleration or a component of the linear acceleration conceived as a vector) along a predefined direction or axis (sensitive axis of the acceleration sensor), due to the condition, according to which the input signal during the predefined time interval (second or fourth predefined time interval) is less in absolute value than a chronologically varying envelope threshold value, which decreases monotonously in absolute value (the first or second envelope threshold value), it being advantageously possible that specifically such input situations may be detected in which oscillations, which decrease monotonously in absolute value, of the input signal (i.e., the measured acceleration) occur, which is correlated highly specifically with click inputs.

An electrical device according to the present invention is configured for carrying out the method according to the present invention. According to one refinement of such an electrical device, it is provided that the electrical device has an input surface and the acceleration sensor. The electrical device according to the present invention is provided, according to another specific embodiment, in particular as an electronic device and has in particular a microcontroller or a digital processing unit (processor), the electrical device in particular being a computer, in particular a portable computer, for example, in the form of a so-called tablet computer, a (mobile) telephone, a game console, an electronic vehicle system, an audio and/or video playback and/or recording device, in particular an MP3 player, a navigation device and/or a musical instrument and/or a watch/"smart watch"/wearable.

Exemplary embodiments of the present invention are illustrated in the drawings and explained in greater detail in the following description.

DETAILED DESCRIPTION

Figure 1:
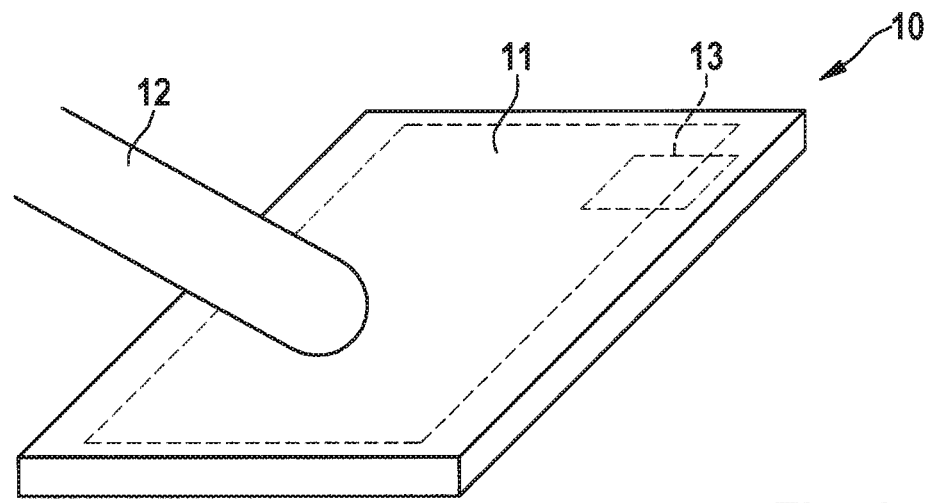
FIG. 1 shows a schematic view of an electrical device including a schematic illustration of its operation by a finger of a user.

In the various figures, identical parts are always provided with identical reference numerals and are therefore generally also only named or mentioned once in each case.

FIG. 1 schematically shows an electrical device 10 according to the present invention, which—for example—is operable by a finger 12 of a user of electrical device 10 in that an input surface 11 is touched, which is in the form of a touch-sensitive surface 11—in particular in the form of a touch-sensitive display unit, a so-called touch screen.

It is often necessary for this purpose to call up or activate functionalities of electrical device 10 by so-called double-click inputs, such a double-click input being implemented by tapping multiple times, in particular two times—in particular using finger 12 of the user—on input surface 11.

The problem exists in this case of reliable detection of such double-click inputs, i.e., on the one hand, the reliable detection that an input operation is actually a double-click input when the user intends a double-click input, and, on the other hand, the reliable exclusion of the detection of a double-click input (i.e., the discarding of the hypothesis of a double-click input) for the case in which the user does not intend a double-click input (but rather, for example, intends another input or does not intend any input at all, but rather is walking while using electrical device 10, for example).

It is provided according to the present invention that electrical device 10 has at least one acceleration sensor 13, which supplies an acceleration signal as an input signal. In this case, the input signal may be, for example, the vector length of the acceleration vector (calculated from all three dimensions) or the acceleration (or a component of the acceleration or the acceleration vector) along a single axis.

Figure 2:
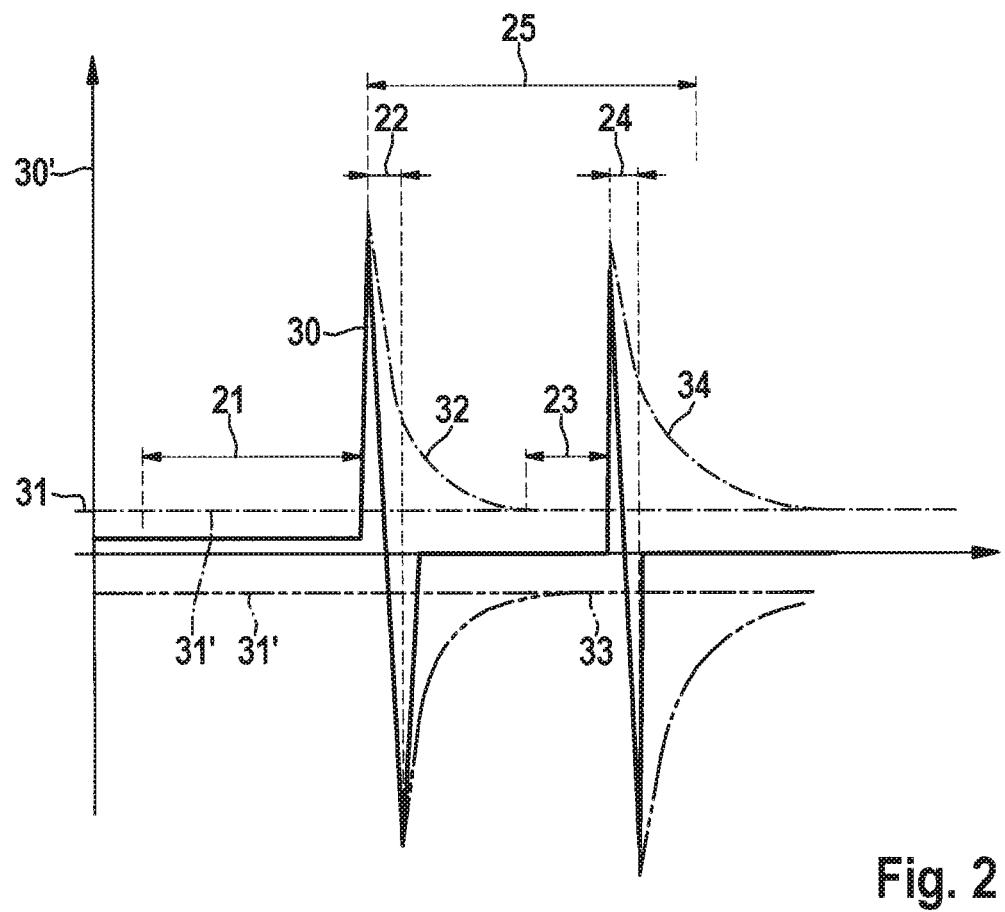
FIG. 2 shows a schematic view of the chronological curve of the input signal.

FIG. 2 shows a schematic view of the chronological curve of input signal 30. Ordinate 30' of the illustration according to FIG. 2 corresponds to the amplitude of input signal 30. According to the present invention, the identification of the input signal as a double-click input or the detection of a double-click input is provided in multiple steps. According to the method according to the present invention and the electrical device according to the present invention, a double-click input is thus detected in that, in a first method step, it is initially monitored whether input signal 30 falls below a predefined first threshold value 31 in absolute value during a first predefined time interval 21. This is a precondition of the identification of a double-click input according to the present invention and means that for the duration of a static reference time (idle phase), i.e., first time interval 21, input signal 30 remains below first threshold value 31 in absolute value, i.e., it remains in the range (lesser values in absolute value) between two (in particular equal in absolute value but having a different sign) signal threshold values 31'. Exceeding one of signal threshold values 31' (or exceeding threshold value 31 in absolute value) within this idle phase (or within first time interval 21) results in a restart of the method, i.e., the detection of the double-click input is aborted.

In a second method step—if input signal 30 has fallen below predefined first threshold value 31 in absolute value during first predefined time interval 21, i.e., the method was not aborted because of exceeding first threshold value 31 in absolute value during first time interval 21—input signal 30 exceeding a second threshold value in absolute value is detected and, within a second predefined time interval 22 after this exceeding of the second threshold value in absolute value, input signal 30 falling below the second threshold value in absolute value at least once is detected. In other words, after idle phase or first time interval 21 has elapsed, exceeding of the second threshold value (or also—for the case that the first threshold value and the second threshold value are equal in absolute value—one of the two threshold values 31') results in the start of a detection time window of static length (i.e., second predefined time interval 22). According to a first variant of the method according to the present invention, it is a prerequisite for the detection of a double-click input that after exceeding the second threshold value in absolute value, (only) input signal 30 falling below the second threshold value in absolute value is detected. According to a second variant of the method according to the present invention, it is a prerequisite for the detection of a double-click input that after exceeding the second threshold value in absolute value, both input signal 30 falling below the second threshold value in absolute value (i.e., falling below one of the two threshold values 31') has to be detected and also exceeding of the particular other one of the two threshold values 31' (i.e., a swinging through action and exceeding linked thereto of the other of the two threshold values 31' with opposite signs) has to take place. If this is the case, the first click or the first part of a double-click input is considered to be identified. If the time window (i.e., second predefined time interval 22) ends according to the second variant of the method according to the present invention without alternating exceeding of the threshold value, the method is restarted. The initial idle phase (i.e., first predefined time interval 21) before the identification of the first click of a double-click input is required in the method according to the present invention after each restart of the method, but not between the identification of the first click and the second click of the double-click input.

After the second method step, it is monitored in a third method step whether input signal 30 falls below a predefined third threshold value 33 in absolute value during a third predefined time interval 23. In a fourth method step—if input signal 30 has fallen below predefined third threshold value 33 in absolute value during third predefined time interval 23—input signal 30 exceeding a fourth threshold value in absolute value is detected and input signal 30 (at least once) falling below the fourth threshold value is detected within a fourth predefined time interval 24 after this exceeding of the fourth threshold value in absolute value. According to the second variant of the method according to the present invention, it is again a prerequisite for the detection of a click of a double-click input that after exceeding the fourth threshold value in absolute value, both input signal 30 falling below the fourth threshold value in absolute value (i.e., falling below one of the two threshold values 31') is detected and also exceeding of the particular other of the two threshold values 31' (i.e., a swinging through action and exceeding linked thereto of the other of the two threshold values 31' with opposite signs) takes place. If this is the case, the second click or the second part of the double-click input is considered to be identified. If the time window (i.e., fourth predefined time interval 24) ends according to the second variant of the method according to the present invention without alternating exceeding of the threshold value, a restart of the method takes place. According to the present invention, it is advantageously provided in particular that instead of static signal threshold values (in the second or fourth method step), two adaptive signal threshold values independent of one another may be used, which are set in the fourth method step (for detecting the second click of the double-click input) as a function of the preceding sensor signal (i.e., from the second method step for detecting the first click of the double-click input).

In the method according to the present invention, it is advantageously possible that double-click inputs wrongly detected as positive are reduced to a minimum. At the same time, a very high detection rate is guaranteed according to the present invention. According to the present invention, this is possible in that signal-specific characteristics of double-click inputs are utilized and detected, which ensure that in the method according to the present invention, no double-click inputs are (wrongly) detected, for example, when walking or driving a car.

According to the present invention, it is monitored proceeding from input signal 30 (in particular an acceleration signal, either the vector length, calculated from all three dimensions, or the acceleration along a single axis) whether (during first time interval 21) a minimum threshold of the acceleration (first threshold value) is exceeded. Before a click may be detected, it is ensured according to the present invention that no movement was detected during first time interval 21 ($t_{quiet}$). If the threshold, i.e., first threshold value 31 is exceeded (in absolute value) after this idle phase, this first threshold value 31, within second time interval 22 (a fixed, very short time $T_{tap}$), thus has to be fallen below according to the first variant of the present invention or not only fallen below in absolute value, but rather also exceeded in the opposite direction according to the second variant of the present invention. In this way, an oscillation of input signal 30 may be detected, which is excited by tapping (the first or second click of the double-click input). This exceeding and falling below is typically not to be found during other activities, for example, walking. To be able to detect such oscillations in input signal 30, it may be provided according to the present invention that input signal 30 is sampled at at least 200 Hz. Subsequently, after the detection of the first click of the double-click input (during second time interval 22), a further tap is detected in a similar way during a fifth time interval 25, i.e., a time $T_{double\ tap}$. In this case, according to one specific embodiment of the present invention, the threshold value to be exceeded, i.e., the fourth threshold value, is raised (in relation to the second threshold value). Furthermore, it may be provided according to the present invention that input signal 30 is less in absolute value during second predefined time interval 22 than a chronologically varying first envelope threshold value 32, which decreases monotonously in absolute value, and/or input signal 30 is less in absolute value during fourth predefined time interval 24 than a chronologically varying second envelope threshold value 34, which decreases monotonously in absolute value. The chronologically varying first or second envelope threshold value, which decreases monotonously in absolute value, initially follows the signal and then decreases exponentially according to the present invention.

Alternatively to the acceleration in the direction of the z axis (vertically from the Earth's surface), the other acceleration axes (individually or in combination) may also be used as input signal 30. In addition, it may be provided according to the present invention that a rotation rate sensor is used for further stabilization of the detection.

To enable detection during walking, the parameterization may be selected in such a way that the threshold follows the acceleration of walking and therefore only the taps exceed the threshold. According to one alternative specific embodiment, it is provided according to the present invention that the data (i.e., input signal 30) are filtered by a high-pass filter, so that it is advantageously made possible to filter away the movement of walking, which is in a lower frequency.

For further reduction of the power consumption when carrying out the method according to the present invention, hardware-implemented interrupts are used to detect double-click inputs. For this purpose, for example, the last acceleration data are stored and read out as soon as the hardware-implemented (but comparatively non-robust) double tap interrupt triggers (i.e., the hardware-implemented double-click input detection). Subsequently, the stored data (for example, on the sensor hub) are analyzed and it is decided whether it is a double-click input (i.e., whether it is a real interrupt) or a wrongly triggered double-click input (i.e., the hardware-implemented double-click input detection has wrongly detected a double-click input). Alternatively, a combination of other hardware-implemented interrupts (for example, interrupts of the type "AnyMotion" and/or "NoMotion") may also be used.

What is claimed is:

1. A method for detecting a double-click input on an electrical device by analyzing at least one input signal generated with the aid of at least one acceleration sensor, the method comprising:
    filtering the input signal with a high pass filter configured to filter away movement of walking entirely;
    monitoring, in a first task, whether the input signal falls below a predefined first threshold value in absolute value during a first predefined time interval;
    detecting, in a second task, if the input signal has fallen below the predefined first threshold value in absolute value during the first predefined time interval, an exceeding of a second threshold value in absolute value by the input signal, and, within a second predefined time interval after the exceeding of the second threshold value in absolute value, detecting the input signal falling below the second threshold value in absolute value;
    monitoring, in a third task, whether the input signal falls below a predefined third threshold value in absolute value during a third predefined time interval; and
    detecting, in a fourth task, if the input signal has fallen below the predefined third threshold value in absolute value during the third predefined time interval, an exceeding of a fourth threshold value in absolute value by the input signal, and within a fourth predefined time interval after this exceeding of the fourth threshold value in absolute value, detecting the input signal falling below the fourth threshold value,
    wherein the input signal during the second predefined time interval is less in absolute value than a chronologically varying first envelope threshold value, which decreases monotonously in absolute value, and/or the input signal during the fourth predefined time interval is less in absolute value than a chronologically varying second envelope threshold value, which decreases monotonously in absolute value.

2. The method of claim 1, wherein the detection of the double-click input on the electrical device only takes place for the case in which the exceeding taking place during the fourth task and subsequently the input signal falling below the fourth threshold value are detected within a fifth time interval after the beginning of the second time interval.

3. The method of claim 1, wherein the second threshold value and the third threshold value are equal in absolute value.

4. The method of claim 1, wherein the second threshold value is less in absolute value than the fourth threshold value.

5. An electrical device for detecting a double-click input by analyzing at least one input signal generated with the aid of at least one acceleration sensor, comprising:
- an electrical arrangement configured to perform the following:
  - filtering the input signal with a high pass filter configured to filter away movement of walking entirely;
  - monitoring, in a first task, whether the input signal falls below a predefined first threshold value in absolute value during a first predefined time interval;
  - detecting, in a second task, if the input signal has fallen below the predefined first threshold value in absolute value during the first predefined time interval, an exceeding of a second threshold value in absolute value by the input signal, and, within a second predefined time interval after the exceeding of the second threshold value in absolute value, detecting the input signal falling below the second threshold value in absolute value;
  - monitoring, in a third task, whether the input signal falls below a predefined third threshold value in absolute value during a third predefined time interval; and
  - detecting, in a fourth task, if the input signal has fallen below the predefined third threshold value in absolute value during the third predefined time interval, an exceeding of a fourth threshold value in absolute value by the input signal, and within a fourth predefined time interval after this exceeding of the fourth threshold value in absolute value, detecting the input signal falling below the fourth threshold value,
- wherein the input signal during the second predefined time interval is less in absolute value than a chronologically varying first envelope threshold value, which decreases monotonously in absolute value, and/or the input signal during the fourth predefined time interval is less in absolute value than a chronologically varying second envelope threshold value, which decreases monotonously in absolute value.

6. The electrical device of claim 5, wherein the electrical device has an input surface and the acceleration sensor.

7. The method of claim 1, wherein at least one of the chronologically varying first envelope threshold value or the chronologically varying second envelope threshold value initially follows the input signal and then decreases exponentially.

* * * * *